United States Patent
Kovacs

(10) Patent No.: US 9,784,942 B2
(45) Date of Patent: Oct. 10, 2017

(54) SYSTEM FOR PARALLAX CORRECTION

(71) Applicant: Sensors Unlimited, Inc., Princeton, NJ (US)

(72) Inventor: Laszlo Kovacs, Whitehouse Station, NJ (US)

(73) Assignee: Sensors Unlimited, Inc., Princeton, NJ (US)

( * ) Notice: Subject to any disclaimer, the term of this patent is extended or adjusted under 35 U.S.C. 154(b) by 0 days.

(21) Appl. No.: 15/132,983

(22) Filed: Apr. 19, 2016

(65) Prior Publication Data

US 2016/0306260 A1 Oct. 20, 2016

Related U.S. Application Data

(60) Provisional application No. 62/149,962, filed on Apr. 20, 2015.

(51) Int. Cl.
| | |
|---|---|
| *G02B 7/06* | (2006.01) |
| *G02B 27/00* | (2006.01) |
| *G02B 13/14* | (2006.01) |
| *G03B 17/12* | (2006.01) |
| *G03B 17/48* | (2006.01) |
| *H04N 5/247* | (2006.01) |
| *G02B 7/02* | (2006.01) |

(52) U.S. Cl.
CPC ............... *G02B 7/06* (2013.01); *G02B 7/023* (2013.01); *G02B 27/0025* (2013.01); *G03B 17/12* (2013.01); *G03B 17/48* (2013.01); *H04N 5/247* (2013.01); *G02B 13/146* (2013.01)

(58) Field of Classification Search
None
See application file for complete search history.

(56) References Cited

U.S. PATENT DOCUMENTS

| | | | | |
|---|---|---|---|---|
| 4,751,570 A | * | 6/1988 | Robinson | H04N 13/0239 348/211.6 |
| 4,879,596 A | * | 11/1989 | Miura | G03B 35/08 348/373 |
| 5,786,847 A | * | 7/1998 | Katayama | H04N 13/0022 348/47 |
| 5,978,015 A | * | 11/1999 | Ishibashi | G03B 35/08 348/47 |
| 6,243,539 B1 | * | 6/2001 | Chen | G03B 13/14 396/377 |
| 2009/0010635 A1 | * | 1/2009 | Strandemar | G02B 23/12 396/133 |

(Continued)

*Primary Examiner* — W B Perkey
(74) *Attorney, Agent, or Firm* — Locke Lord LLP; Scott D. Wofsy; Arpita G. Buesing

(57) ABSTRACT

A system for parallax correction includes a housing of a camera having a channel perpendicular to an optical axis of the camera. A lens enclosure is within the housing and includes a tab slideable along the channel. A first lens is positioned within the lens enclosure having a first focal plane array. A second lens is positioned within the lens enclosure having a second focal plane array. The second focal plane array is coupled to a pin disposed within the tab of the housing. The tab is configured to direct the pin to slide perpendicular to the optical axis along the channel to move the second focal plane array laterally with respect to the first focal plane array to correct for parallax between the first and second lenses.

8 Claims, 2 Drawing Sheets

(56) References Cited

U.S. PATENT DOCUMENTS

2012/0200672 A1* 8/2012 Adachi .................. G03B 35/08
              348/46
2014/0232833 A1* 8/2014 Mizuta ................... G03B 35/08
              348/49
2016/0306259 A1* 10/2016 Kovacs ................ H04N 5/2258
2016/0306260 A1* 10/2016 Kovacs ................ G03B 17/12

* cited by examiner

SYSTEM FOR PARALLAX CORRECTION

CROSS-REFERENCE TO RELATED APPLICATION

This application claims the benefit of priority under 35 U.S.C. §119(e) to U.S. Provisional Application No. 62/149,962, filed Apr. 20, 2015, which is incorporated herein by reference in its entirety.

GOVERNMENT RIGHTS STATEMENT

This invention was made with government support under contract number W90D0-20161 awarded by Defense Advanced Research Projects Agency. The government has certain rights in the invention.

BACKGROUND OF THE INVENTION

1. Field of the Invention

The present disclosure relates to optics, and more particularly to parallax correction between two lenses.

2. Description of Related Art

Night vision systems include image intensification, thermal imaging, and fusion monoculars, binoculars, and goggles, whether hand-held, weapon mounted, or helmet mounted. Infrared thermal imagers allow an operator to see people and objects because they emit thermal energy. Since the primary source of infrared radiation is heat or thermal radiation, any object that has a temperature radiates in the infrared.

With the use of multiple thermal imagers and therefore more than one lens the need for correcting parallax between the lenses exist. Specifically, a remote object can be observed without any problem, because the image of the object is formed substantially at the center of the field of view of each of the right and left optical systems. However, as the object comes closer, its image moves away from the center, with the result that the image of a very close object is formed out of the field of view of each of the right and left optical systems. This problem is due to parallax, and can be solved by various methods. Typical methods which correct for parallax manually demand a great deal of time, but also tend to leave small alignment errors, making it difficult to realize the optical performance as designed.

Such conventional methods and systems have generally been considered satisfactory for their intended purpose. However, there is still a need in the art for improved system for parallax correction. The present disclosure provides a solution for this need.

SUMMARY OF THE INVENTION

A system for parallax correction includes a housing of a camera having a channel perpendicular to an optical axis of the camera. A lens enclosure is within the housing and includes a tab slideable along the channel. A first lens is positioned within the lens enclosure having a first focal plane array. A second lens is positioned within the lens enclosure having a second focal plane array. The second focal plane array is coupled to a pin disposed within the tab of the housing. The tab is configured to direct the pin to slide perpendicular to the optical axis along the channel to move the second focal plane array laterally with respect to the first focal plane array to correct for parallax between the first and second lenses.

A scroll disc having a groove for accepting a second pin can extend radially from the second lens. The scroll disc can be configured to displace the pin axially along the channel. The groove of the scroll disc can be circular.

A slot can be formed within the tab of the lens enclosure to accept the pin there, the slot being curved to accurately direct the pin.

The system can include an actuator for extending and retracting the lens enclosure towards an object to focus on the object. In certain embodiments, the actuator can be coupled to the scroll disc and to the lens enclosure. The knob can be configured to rotate the scroll disc to displace the pin and extend and retract the lens enclosure.

The first lens can be a short wave infrared lens and the second lens can be a long wave infrared lens. The first focal plane array can be separate from the second focal plane array.

A method for correcting for parallax includes extending a first lens and a second lens positioned within a lens enclosure of a housing along an optical axis. The method further includes laterally moving a second focal plane array of the second lens to correct for parallax between the first and second lenses. Laterally moving the second focal plane array can include axially sliding a tab of the lens enclosure within a channel of the housing. The step of extending can include rotating a knob coupled to the lens enclosure to extend and retract the lens enclosure.

The method can include a pin coupled to the second focal plane array. The pin can be accepted into a groove of the tab such that the axially movement of the tab displaces the pin and the second focal plane array laterally with respect to a first focal plane array of the first lens. A rotating a scroll disc can have a groove for accepting a second pin therein, the second pin extending radially from the second lens.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
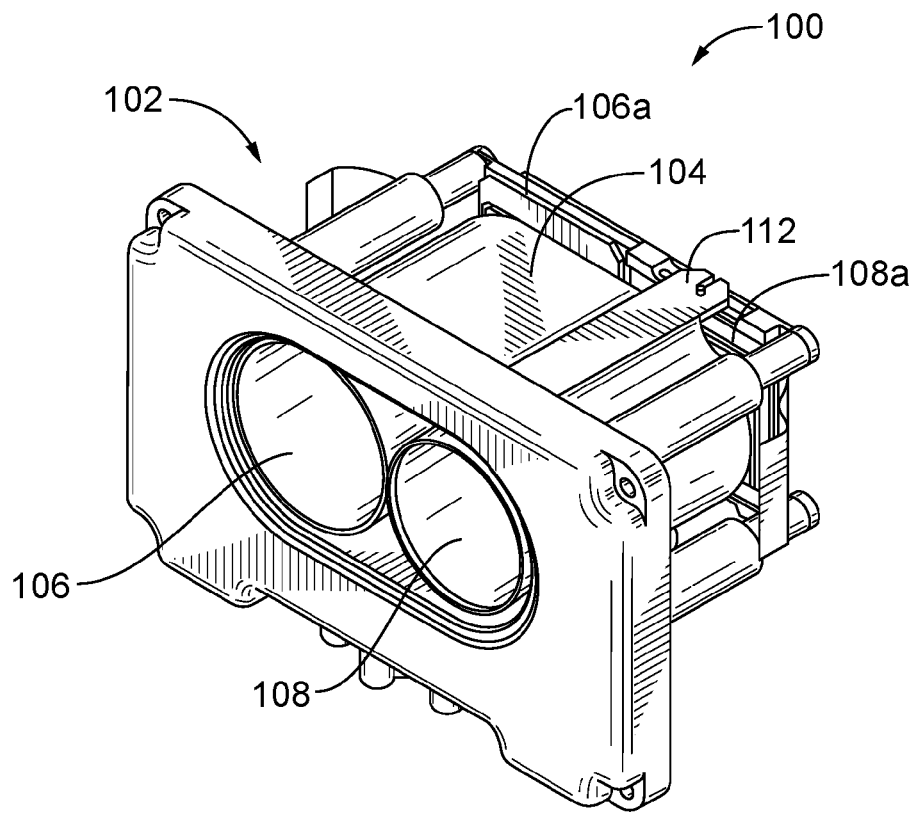
FIG. 1 is a perspective view of an exemplary embodiment of a system for parallax correction constructed in accordance with the present disclosure, showing a housing with a first and second lens within a lens enclosure.

Reference will now be made to the drawings wherein like reference numerals identify similar structural features or aspects of the subject disclosure. For purposes of explanation and illustration, and not limitation, a partial view of an exemplary embodiment of a system for parallax correction in accordance with the disclosure is shown in FIG. 1 and is designated generally by reference character 100. Other embodiments of the system in accordance with the disclosure, or aspects thereof, are provided in FIGS. 2-4, as will be described.

Figure 2:
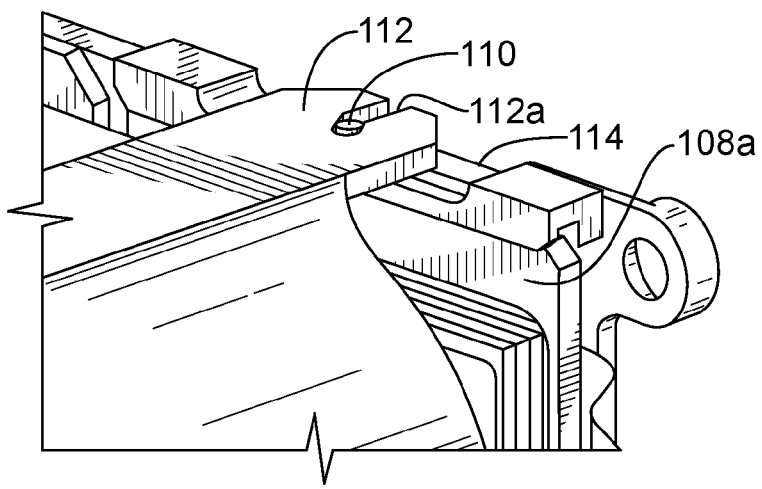
FIG. 2 is a detailed perspective view of the lens enclosure of FIG. 1, showing a tab slideable along a channel of the housing.

With reference to FIG. 1, a system for parallax correction 100 is shown including a housing 102 with a lens enclosure 104. A first lens 106 and a second lens 108 are positioned within the lens enclosure 104. Each of the first and second lenses 106, 108 has a respective focal plane array 106a, 108a that are separate from each other. The focal plane arrays 106a, 108a can move separately from each other. As best seen in FIG. 2, the second focal plane array 108a is coupled to a pin 110 that extends upwardly through the housing 102 and within a tab 112 of the lens enclosure 104. The tab 112 includes a slot 112a for accepting the pin 110. The slot 112a is slightly curved to direct the pin 110. During operation the lens enclosure 104 is extended towards an object to focus on the object. As the lens enclosure 104 is extended, the tab 112 is configured to slide laterally within a channel 114 of the housing 102. More specifically, the tab 112 is configured to direct the pin 110 to slide along the channel 114. In doing so, the pin 110 moves the second focal plane array 108a laterally with respect to the first focal plane array 106a to correct for parallax between the first and second lenses 106, 108.

Figure 3:
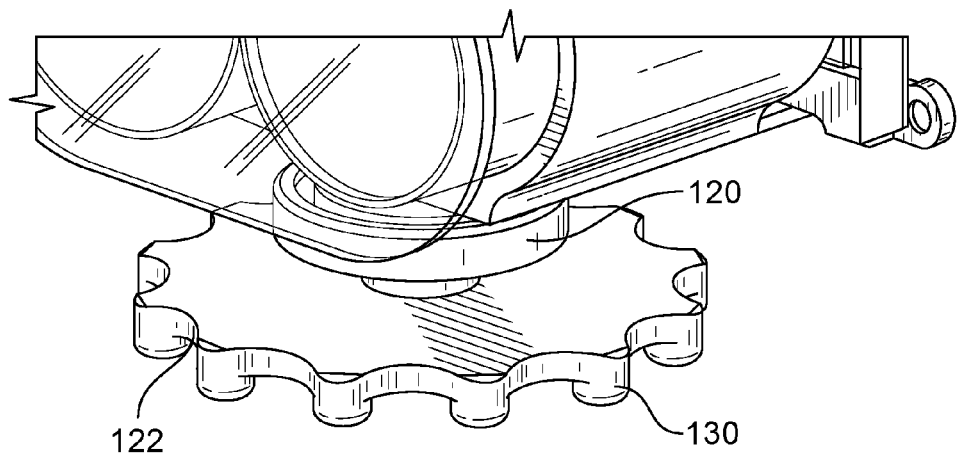
FIG. 3 is a perspective view a portion of the lens enclosure of FIG. 1, showing a scroll disc and knob connected thereto.
Figure 4:
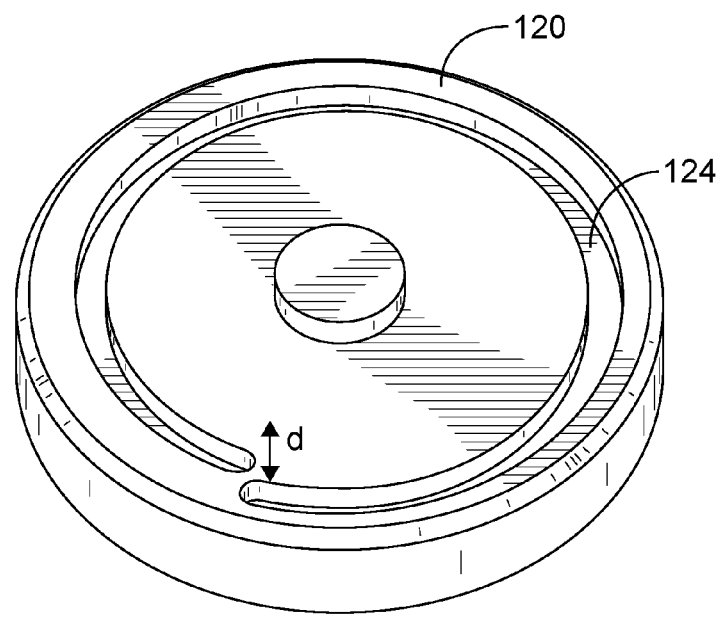
FIG. 4 is a top perspective view of the scroll disc of FIG. 3, showing a radial groove.

A scroll disc 120 (shown in FIGS. 3-4) is positioned within the lens enclosure 104 and coupled to an actuator 130 connected to the housing 102. A second pin 122 extends radially from the second lens 108. The scroll disc 120 includes a groove 124 (shown in FIG. 4) which accepts the second pin 122 therein. As the scroll disc 120 is rotated the second pin 122 is displaced a distance d along the optical axis A. The displacement of the second pin 122 causes the tab 112 of the lens enclosure 104 to slide within the channel 114. As shown in FIG. 4, the displacement d of the second pin 122 is a known distance. Therefore, knowing the displacement of the second pin 122, the distance the lens enclosure 104 can be extended towards the object, and the precise length of the channel 114 of the housing, parallax between the two lenses 106, 108 can be calculated and corrected for.

The actuator 130 is coupled to the lens enclosure 104 and the scroll disc 120 for extending and retracing the lens enclosure 104 towards and object. During operation the actuator 130 is activated to extend the first and second lenses 106, 108 in the lens enclosure 104 while simultaneously displacing the second pin 122 and laterally moving the second focal plane array 108a. As best seen in FIG. 3, the actuator 130 is shown as knob which can be rotated accordingly. However, other suitable means for extending and retracting the lens enclosure and rotating the scroll disc are contemplated.

The methods and systems of the present disclosure, as described above and shown in the drawings, provide for a system for parallax correction with superior properties including laterally displacing at least one focal plane array. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A system for parallax correction, comprising:
   a housing of a camera having a channel perpendicular to an optical axis of the camera;
   a lens enclosure within the housing including a tab slideable along the channel;
   a first lens positioned within the lens enclosure having a first focal plane array; and
   a second lens positioned within the lens enclosure having a second focal plane array, wherein the second focal plane array is coupled to a pin disposed within the tab of the lens enclosure, wherein the tab is configured to direct the pin to slide perpendicular to the optical axis along the channel to move the second focal plane array laterally with respect to the first focal plane array to correct for parallax between the first and second lenses.

2. The system of claim 1, further comprising a scroll disc having a groove for accepting a second pin extending radially from the second lens therein, wherein the scroll disc is configured to displace the pin along the channel.

3. The system of claim 2, wherein the groove of the scroll disc is circular.

4. The system of claim 1, wherein a slot is formed within the tab of the lens enclosure to accept the pin there, the slot being curved to accurately direct the pin.

5. The system of claim 1, further comprising a knob coupled to the scroll disc and to the lens enclosure, wherein the knob is configured to rotate the scroll disc to displace the pin and extend and retract the lens enclosure.

6. The system of claim 1, further comprising an actuator for extending and retracting the lens enclosure towards an object to focus on the object.

7. The system of claim 1, wherein the first lens is a short wave infrared lens and the second lens is a long wave infrared lens.

8. The system of claim 1, wherein the first focal plane array is separated from the second focal plane array.

* * * * *